United States Patent [19]

Lister

[11] 3,821,591

[45] June 28, 1974

[54] CIRCUIT FOR DRIVING QUADRIPOLE CONVERGENCE MEANS

[75] Inventor: John W. Lister, Portsmouth, Va.

[73] Assignee: General Electric Company, Portsmouth, Va.

[22] Filed: Jan. 10, 1973

[21] Appl. No.: 322,276

[52] U.S. Cl. .......................... 315/13 C, 315/27 SR
[51] Int. Cl. .......................... H01j 29/70
[58] Field of Search .......... 315/13 R, 13 C, 27 GD, 315/27 SR

[56] References Cited

UNITED STATES PATENTS

| | | | |
|---|---|---|---|
| 3,577,031 | 5/1971 | Welsh | 315/13 C |
| 3,622,835 | 11/1971 | Parker | 315/13 C |
| 3,732,458 | 5/1973 | Wolber | 315/27 SR |

*Primary Examiner*—Malcolm F. Hubler
*Assistant Examiner*—D. M. Potenza

[57] ABSTRACT

A circuit for deriving suitably shaped current waveforms, modulated at both a horizontal and a vertical scansion rate, and combining them to energize a quadripole-type convergence winding. Retrace pulses derived from a horizontal output transformer are applied by way of a waveshaping circuit to a first end of the convergence winding. A voltage waveform derived from the vertical deflection current is applied to a rectifier and passed through waveshaping circuitry to provide a vertical-rate current waveform to the convergence winding. The circuitry used for shaping the vertical rate current waveform presents a high impedance to horizontal-rate signals so that no crosstalk between horizontal and vertical deflection systems occurs.

10 Claims, 2 Drawing Figures

PATENTED JUN 28 1974

3,821,591

CIRCUIT FOR DRIVING QUADRIPOLE CONVERGENCE MEANS

BACKGROUND OF THE INVENTION

The present invention relates to color television receivers and, more particularly, to improved means for energizing dynamic convergence apparatus.

Most conventional color television receiver cathode ray tubes produce three electron beams for exciting elements constituted of ones of three different color-emitting phosphors. The elements which may be dots are thus selectively excited to produce a color display on the face of the tube. As is the case with monochrome receivers, the electron beams are periodically swept across the face of the tube and modulated to excite the phosphor surface in a predetermined pattern. Unlike monochrome receivers, however, the presence of a plurality of electron beams creates additional problems since in addition to merely deflecting the beams the relative beam positions must be maintained despite varying gun-to-faceplate distances and unequal angles of deflection.

For this reason, it has been found necessary to provide multi-beam color cathode ray tubes with dynamic convergence devices. Such devices commonly produce time-varying magnetic fields in a region through which the beams pass, modifying the relative position of the beams in synchronism with the deflection process. Typically dynamic convergence is effected by means of complex electromagnetic pole pieces associated with the electron gun structure and disposed within the neck of the cathode ray tube.

Recently, however, improved dynamic convergence means have been developed which do not require the presence of cooperating magnetic members within the neck of the tube. Such convergence means advantageously comprise an annular core having a set of series-connected windings thereon, and are more fully described in my U.S. Pat. application Ser. No. 243,808, filed Apr. 13, 1972, now abandoned in favor of continuation application Ser. No. 381,028, filed July 20, 1973. In order to properly operate such devices, herein generally referred to as multipole convergence means, an energizing current is required which has characteristics different than those required for driving conventional, prior-art dynamic convergence devices. Heretofore, vertical- and horizontal-rate signals have been derived from vertical and horizontal deflection systems and applied to dynamic convergence waveshaping circuits which shape the various horizontal- and vertical-rate signals. Separate windings were provided for individually controlling each electron beam. The currents supplied to different windings were often given different characteristics, and in most cases separate sets of windings were provided for vertical- and horizontal-rate currents to avoid crosstalk between vertical and horizontal deflection drive systems.

However, with multipole convergence means, as herein defined, the convergence windings are arranged about the neck of the cathode ray tube and connected in series so that all windings receive the same current. Thus, prior art convergence drive systems are incapable of properly energizing the multipole convergence devices. It will therefore be seen that it would be advantageous to provide improved circuit means for energizing such multipole convergence means.

It is therefore an object of the present invention to provide improved means for supplying current for dynamically converging electron beams in a cathode ray tube.

It is a further object of this invention to provide improved circuit means for producing a current modulated at both vertical and horizontal scansion rates, and having a predetermined waveshape.

It is still another object of the invention to provide means for supplying current to a multipole convergence means and energizing pincushion correction means.

SUMMARY OF THE INVENTION

Briefly stated, in accordance with one aspect of the invention the foregoing objects are achieved by providing a horizontal output transformer with means for deriving retrace or "flyback" voltage pulses which arise at the horizontal scansion rate. The pulses are transmitted to a waveshaping device and then applied to a multipole convergence means. Means coupled to the vertical deflection system produce a signal which reflects the waveshape of the vertical deflection current. The signal gives rise to current which fluctuates at the vertical scansion rate and is applied to the multipole convergence means by way of a second waveshaping device.

In one embodiment the waveshaping means comprise an autotransformer, horizontal-rate signals being applied to one end of the autotransformer winding and vertical-rate signals to the other. Current is transferred to the convergence windings from a tap intermediate the ends of the autotransformer winding, and clamping means are provided in shunt with the convergence windings to prevent undesirable voltage excursions. In another embodiment, separate inductors are employed to shape the horizontal- and vertical-rate signals, the inductor used to shape the vertical-rate signal presenting a substantial impedance to horizontal-rate signals and preventing the introduction thereof into the vertical deflection system.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENTS

Figure 1:
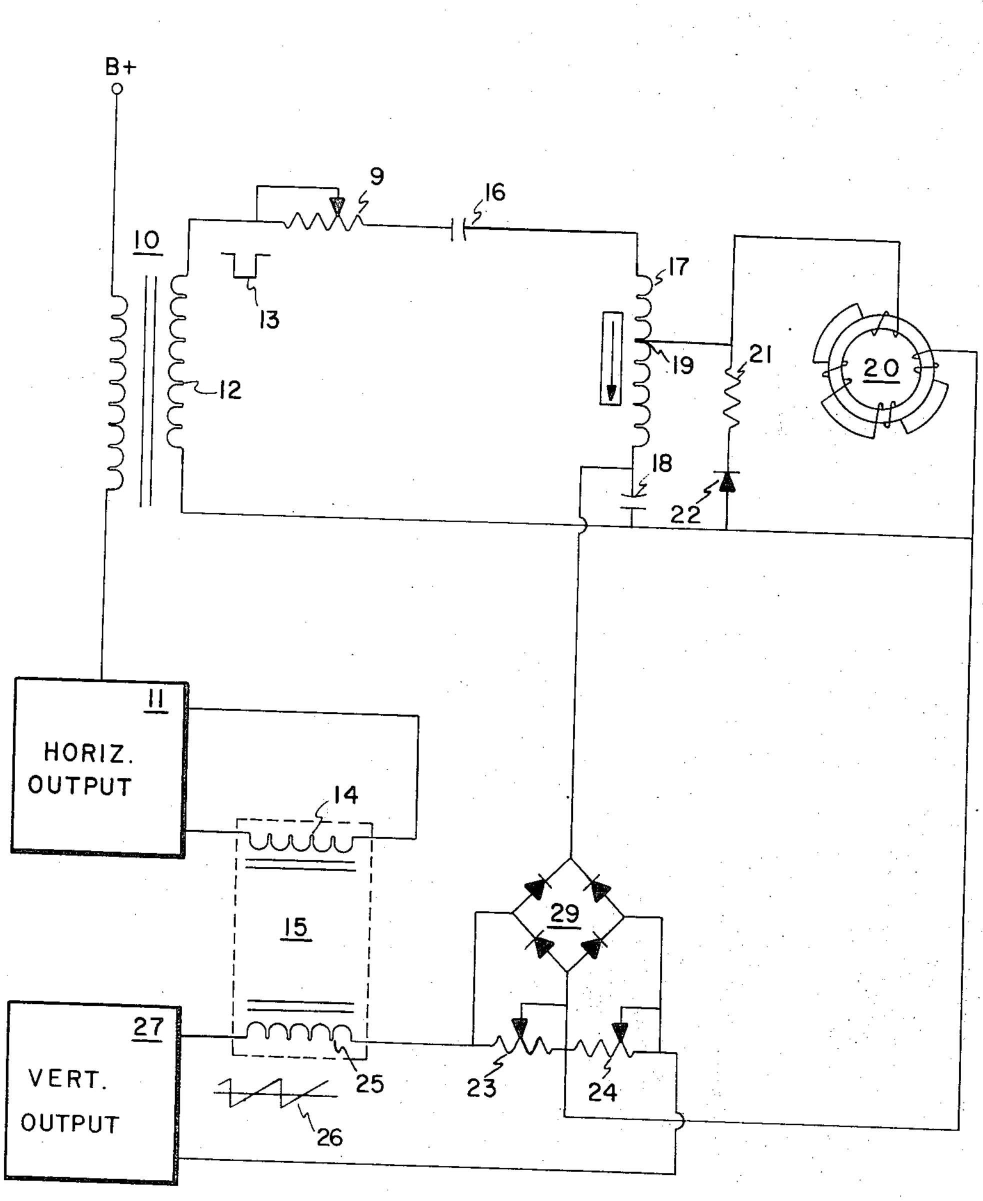
FIG. 1 is a schematic drawing of one embodiment of the present invention.

FIG. 1 shows one embodiment of the inventive system which is adapted to produce current suitable for driving a multipole convergence device. As used herein, a "multipole convergence" means is a dynamic convergence device generally of the type disclosed in the aforementioned copending application. Such a convergence apparatus advantageously comprises a plurality of series-connected windings formed upon a magnetic core disposed about the neck of a cathode ray tube and adapted to produce a plurality of magnetic poles about the tube neck for supporting a predetermined magnetic field there within. While both four-and-six-pole convergence means may be used, the specifics of the convergence apparatus used comprises no part of the present invention. Unlike prior art convergence systems, the series connection of multipole convergence windings dictates that the current through each winding be identical. In contradistinction, prior art convergence systems commonly utilize separate windings to produce a magnetic field between individual pairs of aligned magnetic elements, termed pole shoes, which field varies in synchronism with the horizontal and vertical deflection of the electron beams. Oftentimes the values of the currents driving each of the various windings are different. In addition, separate windings are commonly provided for horizontal and vertical-rate currents. Six individual windings are therefore commonly present, with each winding often requiring special drive circuitry to provide it with a current waveform having unique characteristics.

Since for most color television receiver systems it is necessary to converge electron beams as a function of both the vertical and horizontal deflection thereof, it is necessary to modulate the convergence drive current flowing through the multipole windings at both the horizontal and vertical scansion rates. However, simply conducting vertical and horizontal rate signals to a common convergence winding may be unsatisfactory since the higher-frequency horizontal rate signals often infiltrate the vertical deflection system. In particular, the higher frequency horizontal-rate signals may be transmitted back through those portions of the circuit used to produce vertical deflection current, giving rise to spurious oscillations which disturb the vertical deflection process. The inventive system taught herein serves to produce a current suitable for driving the multipole convergence windings in synchronism with both horizontal and vertical deflection, while preventing the introduction of unwanted horizontal-rate signals in the vertical deflection system.

FIG. 1 shows in schematic form one circuit adapted for use in a television receiver using a multipole convergence device. A horizontal output transformer 10 is energized by horizontal output stage 11 and is provided with a secondary winding 12 adapted to receive rectangular "flyback" pulses 13 produced during the retrace portion of the horizontal scansion cycle. The horizontal windings 14 of a deflection yoke 15 are also energized by horizontal output 11. A resistor 9 and a capacitor 16 are connected in series with secondary winding 12 and serve to couple the upper end of scondary winding 12 to one end of an autotransformer 17. The opposite or lower end of the autotransformer is returned to the bottom of winding 12 by means of a capacitor 18. A tap 19 intermediate the ends of autotransformer 17 is connected to one end of the series windings of a multipole convergence means 20. The opposite end of the series-connected convergence windings is advantageously coupled directly to the lower end of secondary winding 12. A clamping circuit comprising the series combination of a resistor 21 and a diode 22 are coupled in shunt across the windings of convergence means 20.

Current flowing from vertical output stage 27 traverses resistors 23 and 24, and the vertical deflection windings 25 of yoke 15. The voltage waveform arising across resistors 23 and 24 thus reflects the bipolar sawtooth current 26. This voltage is impressed across a full-wave rectifier 29, here shown as a conventional diode bridge. The rectifying action of the bridge produces a current waveform which corresponds to a rectified version of current waveform 26. The current produced by rectifier 29 alone would thus appear as a series of clipped triangular pulses whose maxima occur at the beginning and end of each vertical scansion period and their minima at the midpoint of the scansion period.

The operation of the circuit will now be discussed, making reference to the elements enumerated in FIG. 1. Upon the production of scansion signals by horizontal drive stage 11, the abrupt termination of each such scansion signal occasions a retrace or flyback pulse which arises for a relatively brief period. Such a pulse, herein illustrated at 13, arises across secondary winding 12 of transformer 10 at the horizontal scansion rate. The voltage pulse traverses an adjustable resistor, shown here as potentiometer 9, and a capacitor 16. Current from capacitor 16 flows into the upper end of autotransformer winding 17. The values of capacitor 16 and the upper segment of autotransformer winding 17 are proportioned to produce a series L-C circuit which resonates at the horizontal scansion rate. The horizontal-rate current which flows from tap 19 intermediate the ends of the autotransformer is thus given a sinusoidal waveshape for effecting the convergence of electron beams in synchronism with the horizontal deflection thereof.

A portion of the current arising in response to the flyback pulses traverses the full length of the autotransformer winding and flows through capacitor 18 before returning to the lower end of secondary winding 12. Capacitor 18 serves to prevent a voltage which fluctuates at the horizontal scansion rate from arising at the top or output terminal of rectifier 29.

Since there is but a single set of windings provided for effecting the convergence of the electron beams, the current flowing through the windings must also be modulated at the vertical scansion rate so that beam convergence will vary with both horizontal and vertical deflection. To this end, resistance means comprising potentiometers 23 and 24 are coupled in series with the vertical deflection windings 25 of yoke 15 so that a vertical deflection current exhibiting a waveform such as that shown at 26 flows through the two resistors. The voltage arising across the resistors reflects the current waveform, approximating the illustrated bipolar sawtooth configuration.

A full-wave rectifier 29, here shown comprising four diodes connected in the familiar bridge configuration, has opposing nodes thereof coupled to the opposite ends of potentiometers 23 and 24. The bottom node of the bridge is coupled to the inersection of potentiometers 23 and 24 so that a bipolar sawtooth voltage is impressed across the bridge. The bridge operates in a manner well known to those skilled in the art to produce full-wave rectified current at the upper node thereof. Rectification of the bipolar sawtooth voltage arising across the resistors of potentiometers 23 and 24 produces a current waveform having maxima at the beginning and the end of each vertical scansion period and a minimum at the midpoint of each such period. Each potentiometer supports a voltage waveform which produces convergence over one-half of the vertical scansion process. Potentiometer 24 may then be adjusted to provide convergence of the lower half of the raster while potentiometer 23 serves to vary vertical-rate convergence over the upper half. In the embodiment depicted, current outputted by rectifier 29 flows to the lowermost end of autotransformer 17. The inductive properties of the lower segment of the autotransformer winding are such as to not materially affect the current waveform, serving primarily to round off the "breaks" or linear discontinuities in the waveform. It should be noted that the value of capacitor 18 is such as to present a substantial impedance to vertical-rate signals, so that vertical current is constrained to flow through the windings of the autotransformer. The current waveform, modulated at the vertical scansion rate, then additively combines with the horizontal-rate current waveform derived from the upper portion of autotransformer 17 and flows outwardly from tap 19 to the series windings of multipole convergence means 20.

As will be evident from the aforementioned patent application, a unidirection current is desired for proper operation of convergence means 20. In order to prevent current reversal and to bias the input end of the convergence windings at a suitable positive potential, clamping means comprising the series combination of resistor 21 and diode 22 are provided. Diode 22 is poled to allow current to flow upwardly, but blocks its flow in a downward direction. A clamping action is thus provided which assures unidrectional current flow through the windings of multipole convergence means 20.

Figure 2:
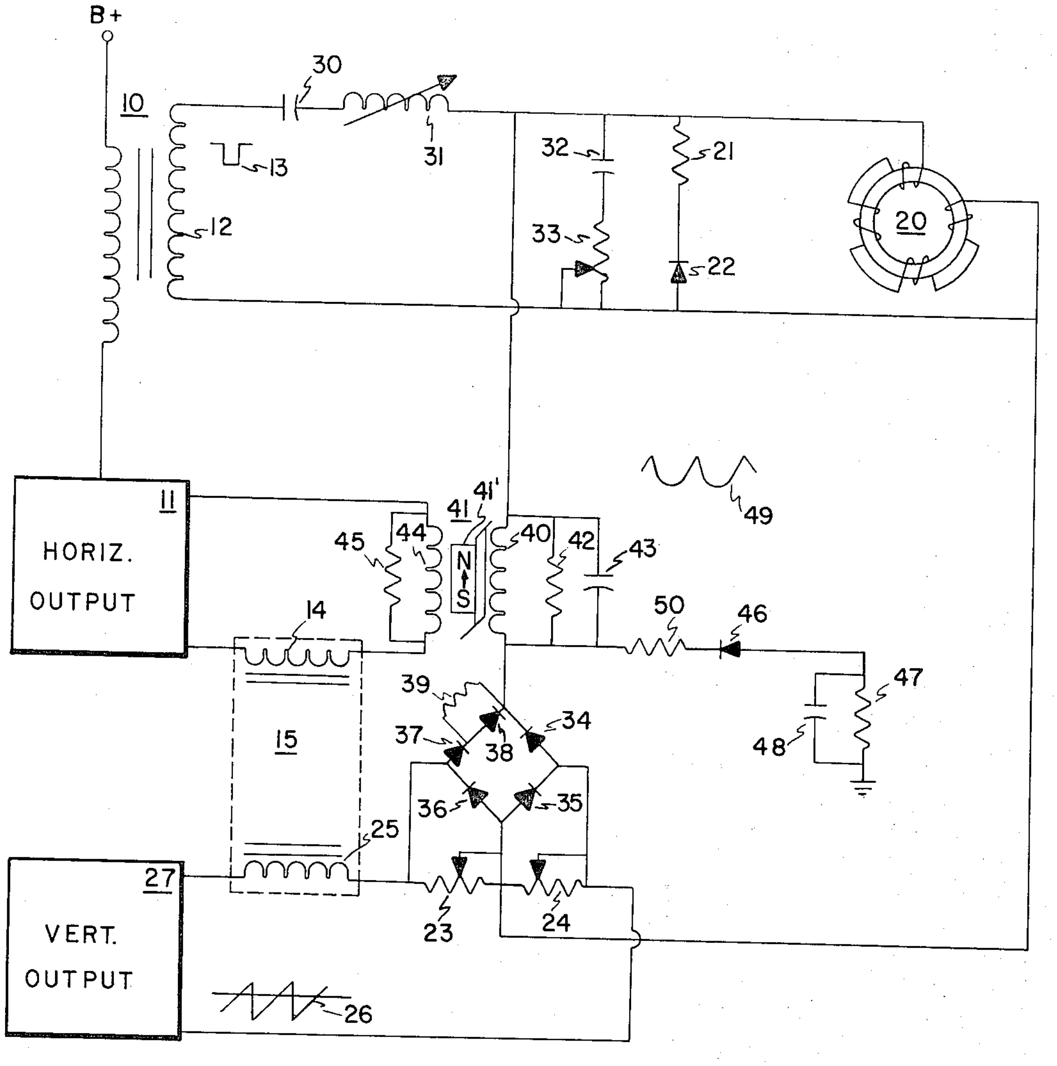
FIG. 2 is a schematic drawing of anothere embodiment of the invention.

Turning now to FIG. 2, there is shown another embodiment of the present invention which has been found to yield satisfactory results in a prototype receiver. Capacitor 30 and adjustable inductor 31 are series-connected between one end of secondary winding 12 of a horizontal output transformer 10 and one end of the series-connected convergence windings of multipole convergence means 20. The other end of the windings is returned to the bottom of secondary winding 12. Capacitor 32 and adjustable resistor 33 are series-connected in shunt with the windings of convergence means 20, as are the series combination of a resistor 21 and diode 22.

The resistive elements of potentiometers 23 and 24 are connected in series with vertical deflection winding 25 of deflection yoke 15 and coupled across a rectifying bridge including diodes 34 through 38, diode 38 being shunted by resistor 39. Current flowing from the topmost node of the bridge traverses an inductive element which is shown as the primary or control winding 40 of a raster or "pinchushion" correction transformer 41. Transformer 41 advantageously exhibits the characteristics of a saturable reactor and is constructed in a manner hereafter described. Control winding 40 is shunted by damping resistor 42 and capacitor 43, while the secondary or controlled winding 44 thereof is shunted by resistor 45. The intersection of the rectifying bridge and pincushion correction transformer is coupled to a point of reference potential through a diode 46, resistor 50 and the parallel combination of resistor 47 and capacitor 48.

In operation, a horizontal retrace or flyback pulse 13 appears upon output winding 12 of the horizontal output transformer. The current produced by flyback pulse 13 traverses capacitor 30 and inductor 31 before reaching convergence means 20. In addition, some of the horizontal-rate current flows through capacitor 32 and adjustable resistor 33. Capacitor 30 and 32, resistor 33 and inductor 31 cooperate in a manner known to those skilled in the art to impart a parabolic shape to the periodic surges of current arising in response to flyback pulse 13. By varying the value of inductor 31 that portion of the parabolic waveshape which corresponds to the right side of the rastor may be varied, while convergence current for the left side may be varied by changing the value of adjustable resistor 33. In this manner, the characteristics of the horizontal-rate current waveform may be varied to suit a given application. The series combination of resistor 21 and diode 22 effect a clamping action to produce a predetermined bias upon the input end of the convergence windings and to keep current flow from reversing.

With most shadow mask-type color cathode ray tubes it is necessary to dynamically converge the electron beam pattern as a function of both vertical as well as horizontal deflection. For that reason, current modulated at the vertical scansion rate must be introduced into the windings of convergence means 20. As was the case with the embodiment shown in FIG. 1, the voltage waveform arising across serially connected resistors 23 and 24 reflects the sawtooth current 26 supplied by vertical output stage 27 to the vertical deflection windings 25. Resistors 23 and 24 may advantageously take the form of potentiometers having the sliders thereof coupled to one end of the resistive portion to provide an adjustable capability to the circuit.

A rectifying bridge is provided and comprises five diodes numbered 34 through 38. It will be noted that in the disclosed embodiment one of the four legs of the bridge is considered to comprise two serially connected diodes 37 and 38.

The lateral nodes of the bridge are connected to the opposing ends of resistors 23, 24 while the bottom or reference node of the bridge is connected to the intersection of these resistors. The bipolar sawtooth voltage arising across resistors 23, 24 is rectified by the diode bridge and gives rise to a series of generally triangular pulses of current 49 which issue from the upper node of the bridge. The extra diode 38 and associated resistor 39 serve to mitigate the "breaks" or linear discontinuities in current waveform 49 and to round off the current waveform characteristic near its minima.

In order not to short out the horizontal rate voltage appearing across convergence means 20, an inductor, in this case the control winding 40 of pincushion corrector 41, is interposed between the upper node of the diode bridge and convergence means 20. The inductance of control winding 40, while presenting a high impedance to the horizontal rate signals, presents a relatively low impedance to the vertical rate current supplied by the diode bridge.

Nevertheless, the inductance of control winding 40 modifies the current output of the diode bridge circuit. In general, the presence of the inductance improves the current waveform 49, by rounding off any remaining discontinuities appearing therein. However, the presence of the inductance prevents the current from attaining the proper value near the beginning of the vertical scansion period. Circuit elements 46, 47, 48 and 50 are used to provide the additional convergence current required at the beginning of the vertical scansion period. During vertical retrace time, due to the inductance of vertical deflection winding 25, a negative going voltage pulse appears at the lower node of the diode bridge circuit. Diode 46 conducts through resistor 50, control winding 40 and convergence means 20 during the vertical retrace interval, charging capacitor 48. Resistor 47, in parallel with capacitor 48, partially discharges the latter during the vertical trace period. The values of the circuit elements 47, 48 and 50 are chosen so that the current 49 has the amplitude required for convergence at the beginning of the vertical scansion period. It will be recognized by those skilled in the art that many other means could be selected to modify or shape the current waveform, the means shown comprising only one of many possible approaches.

As is known by those skilled in the art, the so-called pincushion phenomenon is manifested as a concavity of opposite sides of a displayed raster. Vertical pincushion distortion is manifested as a concavity of the upper and lower edges of a raster, while horizontal pincushion distortion appears at the vertical boundaries of the raster.

In order to correct or compensate for horizontal pincushion distortion, horizontal deflection current is modulated at the vertical scansion rate. In the disclosed circuit this is done by means of a saturable transformer such as that shown at 41.

The secondary or controlled winding 44 of transformer 41 is connected in series with horizontal deflection winding 14 so that horizontal deflection current can be modulated as a function of the vertical-rate current flowing from the rectifying bridge. A damping resistor 45 is placed in shunt about the secondary winding 44 to minimize unwanted oscillations or ringing. In like manner, resistor 42 and capacitor 43 are connected in shunt with primary winding 40 to damp out high frequency oscillations resulting from the presence of horizontal deflection signals in transformer 41. In this manner horizontal-rate disturbances are prevented from arising in the convergence current.

In order that reactor 41 provide pincushion correction, a permanent magnet 41' is disposed in close proximity to the core of the transformer. Magnetic flux from the permanent magnet pre-saturates the transformer core to a predetermined degree and in a direction opposite to that resulting from the convergence current.

Thus, as the amplitude of the convergence current increases the core of the transformer de-saturates. This desaturation of the core causes the inductance of winding 44 to increase and results in a reduction of the scan current flowing through horizontal deflection winding 14 of yoke 15. Since the vertical rate current flowing through control winding 40 is essentially the same as the vertical rate convergence current 49 flowing through convergence means 20, the resulting modulation of the horizontal deflection is such as to provide pincushion correction.

It will now be seen that there has been disclosed a system for producing horizontal and vertical-rate currents having desired waveforms, and for applying these waveforms additively to a common set of windings to effect convergence of a set of electron beams in synchronism with the horizontal and vertical deflection thereof. Further, the superposition of current waveforms has been accomplished without the introduction of signals arising at a first, higher rate into a deflection system producing signals which arise at a second, lower rate. As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. In a color television receiver including a multibeam cathode ray tube, beam deflection means associated with said cathode ray tube for deflecting the electron beams in a horizontal and a vertical direction, and convergence means for maintaining the relative position of the beams throughout the deflection thereof comprising:

a single composite convergence winding disposed adjacent the neck of said cathode ray tube for modifying the relative position of the electron beams as a function of both horizontal and vertical deflection thereof, first means for developing a source of pulses at the horizontal deflection rate, second means for developing a source of pulses at the vertical deflection rate, horizontal waveshaping means responsive to the horizontal rate pulses for imparting a desired configuration thereto, vertical waveshaping means responsive to the vertical rate pulses for imparting a desired configuration thereto, said vertical waveshaping means presenting an impedance to the horizontal rate pulses that is substantially higher than the impedance presented to the vertical rate pulses, means to additively combine the vertical rate shaped pulses with the horizontal rate shaped pulses, and coupling means to supply the combined horizontal and vertical rate pulses to said convergence winding, said coupling means including unidirectional current conducting means to insure unidirectional current flow in said convergence winding.

2. The invention defined in claim 1 wherein said horizontal waveshaping means and said vertical waveshaping means include the combining means.

3. The invention defined in claim 2 wherein said horizontal waveshaping means and said vertical waveshaping means include portions of an electrically continuous winding formed on a common core, said continuous winding having an intermediate point for additively combining the shaped horizontal rate pulses and shaped vertical rate pulses, and said coupling means being connected to said intermediate point.

4. The invention defined in claim 1 wherein said vertical waveshaping means includes rectifying means to produce undirectional vertical rate pulses.

5. The invention defined in claim 4 wherein said horizontal waveshaping means includes first inductive means coupled between said first means and said convergence winding, and said vertical waveshaping means includes a second inductive means coupled between said rectifying means and said convergence winding.

6. The invention defined in claim 5 wherein said second inductive means comprises the primary winding of a raster correction transformer, said raster correction transformer having the secondary winding thereof coupled in electrical circuit relationship with said beam deflection means.

7. The invention defined in claim 6 wherein said raster correction transformer exhibits a substantially nonlinear saturation characteristic when energized by said vertical rate pulses.

8. The invention defined in claim 7, further including permanent magnetic means associated with said raster correction transformer for varying the saturation characteristic of said transformer.

9. The invention defined in claim 8, further including unidirectional conducting means coupled between a point of reference potential and the intersection of said rectifying means and said second inductive means.

10. The invention defined in claim 9, wherein said rectifying means comprises a diode bridge having first, second, third and fourth legs thereof, said first, second and third legs each comprising a single diode, and said fourth leg comprises first and second diodes connected in series circuit relationship, one of said series-connected diodes having a resistor connected in shunt therewith.

* * * * *